MORGAN & TERRELL.
Wagon Brake
No. 80,201.  Patented July 21, 1868.
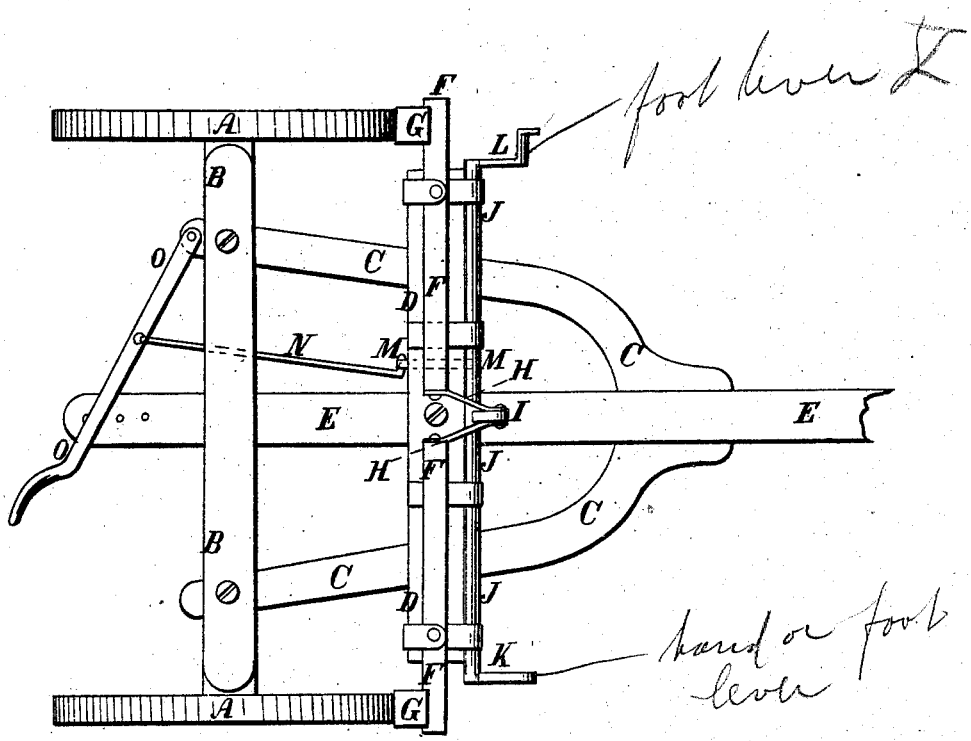

United States Patent Office.

WILLIAM B. MORGAN AND J. H. TERRELL, OF ANTIOCH, INDIANA.

Letters Patent No. 80,201, dated July 21, 1868.

IMPROVEMENT IN WAGON-BRAKE.

The Schedule referred to in these Letters Patent and making part of the same.

TO ALL WHOM IT MAY CONCERN:

Be it known that we, WILLIAM B. MORGAN and J. H. TERRELL, of Antioch, in the county of Huntington, and State of Indiana, have invented a new and useful Improvement in Wagon-Brakes; and we do hereby declare that the following is a full, clear, and exact description thereof, which will enable those skilled in the art to make and use the same, reference being had to the accompanying drawings, forming part of this specification, in which—

The figure is a top view of the rear part of the running-gear of a wagon, to which our improved brake has been attached.

Our invention has for its object to improve the construction of wagon-brakes, so as to adapt them for use with different kinds of loads.

And it consists in the construction and combination of various parts of the brake, as hereinafter more fully described.

A are the rear wheels of the wagon, B is the rear axle, and C are the rear hounds, about the construction of which parts there is nothing new.

D is a wooden bar, securely attached to the hounds C and to the reach E, a little in front of the wheels A.

F are two short levers, pivoted to the ends of the bar D, and to the outer ends of which are attached the brake-shoes G.

The inner ends of the levers F extend inward until they nearly meet, and to them are pivoted the rear ends of the short connecting-rods H, the other ends of which are pivoted to the end of the short arm or lever I, attached to or formed upon the rock-bar J, which works in bearings attached to the stationary bar D.

To one end of the rock-bar J is rigidly attached, or upon it is formed, an arm or lever, K, which is connected to the hand or foot-lever near the driver's seat by a connecting-rod, in the ordinary manner.

To the other or extended end of the rock-shaft J is rigidly attached, or upon it is formed a foot-lever, L. The lever L enables the brake to be operated by the driver when the wagon is loaded with lumber, gravel, or other loading of such a kind that the driver usually sits upon the side of his load.

The arm or lever L also enables the driver to apply the brake by hand when walking at the side of the loaded wagon.

M is an arm or lever attached to the rock-bar J, and projecting downward and rearward. To the end of the arm or lever M is pivoted the forward end of the connecting-rod N, the rear end of which is pivoted to the lever O.

One end of the lever O is pivoted to the rear axle B, or to some other convenient part of the gearing. The lever O rests upon the rearwardly-projecting end of the reach E, and upon its end is formed a handle, so that the brake may be applied by any one walking behind the wagon.

This arrangement is designed to be used when the wagon is loaded with logs, hay, or other loading that prevents the brake from being operated in the ordinary manner.

By means of a pin, passed through the end of the reach E in the rear of the lever O, the brake may be held against the wheel as long as desired.

We claim as new, and desire to secure by Letters Patent—

1. The combination of the arm or lever M, connecting-bar N, and pivoted lever O, with the rock-bar J, substantially as herein shown and described, and for the purpose set forth.

2. The combination of the stationary bar D, short levers F, rock-bar J, arms or levers K I M L, connecting-rod N, and pivoted lever O with each other, substantially as herein shown and described, and for the purposes set forth.

The above specification of our invention signed by us, this 9th day of April, 1868.

WILLIAM B. MORGAN
J. H. TERRELL.

Witnesses:
E. J. ANDERSON,
JOHN LONG.